United States Patent
Jo et al.

(10) Patent No.: US 8,605,670 B2
(45) Date of Patent: Dec. 10, 2013

(54) METHOD FOR SELECTING A RELAY STATION

(75) Inventors: Jun Ho Jo, Anyang-si (KR); Je Min Lee, Anyang-si (KR); Dae Sik Hong, Anyang-si (KR); Byeong Woo Kang, Anyang-si (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 118 days.

(21) Appl. No.: 13/142,258

(22) PCT Filed: Dec. 21, 2009

(86) PCT No.: PCT/KR2009/007640
§ 371 (c)(1),
(2), (4) Date: Jun. 24, 2011

(87) PCT Pub. No.: WO2010/074470
PCT Pub. Date: Jul. 1, 2010

(65) Prior Publication Data
US 2011/0255462 A1    Oct. 20, 2011

(30) Foreign Application Priority Data
Dec. 24, 2008  (KR) .................. 10-2008-0133325

(51) Int. Cl.
*H04W 4/00*      (2009.01)

(52) U.S. Cl.
USPC ............................ 370/329; 370/252; 370/332

(58) Field of Classification Search
USPC ......................................... 370/252, 329, 332
See application file for complete search history.

(56) References Cited

U.S. PATENT DOCUMENTS

| | | | |
|---|---|---|---|
| 2004/0166853 A1* | 8/2004 | Takeda et al. | 455/434 |
| 2006/0281404 A1* | 12/2006 | Lee et al. | 455/11.1 |
| 2008/0170603 A1* | 7/2008 | Hyon et al. | 375/214 |
| 2009/0073913 A9* | 3/2009 | Wentink | 370/315 |
| 2009/0245159 A1* | 10/2009 | Oyman et al. | 370/315 |

FOREIGN PATENT DOCUMENTS

| | | |
|---|---|---|
| KR | 10-2008-0084750 A | 9/2008 |
| KR | 10-2008-0085323 A | 9/2008 |
| KR | 10-2008-0097079 A | 11/2008 |
| KR | 10-2008-0098874 A | 11/2008 |

* cited by examiner

Primary Examiner — Jason Mattis
(74) Attorney, Agent, or Firm — Ladas & Parry, LLP (57) ABSTRACT

A method for selecting a relay station includes enabling a cognitive radio system to receive status information regarding a plurality of candidate relay stations, licensed target stations, and non-licensed target stations, determining an available power threshold value in consideration of the amount of interference affecting the licensed target station and a maximum power value when data is transmitted to the non-licensed target station, and selecting a relay station to be used in transmitting the data in the available power threshold value, in consideration of the status information and the amount of interference.

7 Claims, 5 Drawing Sheets

METHOD FOR SELECTING A RELAY STATION

CROSS-REFERENCE TO RELATED APPLICATIONS

This application is a 371 U.S. national stage application of International Application No. PCT/KR2009/007640, filed on Dec. 21, 2009, which claims priority to Korean Application No. 10-2008-0133325, filed on Dec. 24, 2008, the contents of which are incorporated by reference herein in their entirety.

TECHNICAL FIELD

The present disclosure relates to a method for selecting a suitable relay station and a transmission method.

BACKGROUND ART

The Institute of Electrical and Electronics Engineers (IEEE) 802.16 standard provides techniques and protocols for supporting broadband wireless access. The standardization thereof was started in the year of 1999, and the IEEE 802.16-2001 was approved in 2001.

This is based on a single carrier physical layer called 'WirelessMAN-SC'. In the IEEE 802.16a standard approved in 2003, 'WirelessMAN-OFDM' and 'WirelessMAN-OFDMA' were added to the physical layer, in addition to 'WirelessMAN-SC'. The IEEE 802.16-2004 standard, revised after the completion of the IEEE 802.16a standard, was approved in 2004. In order to correct bugs and errors of the IEEE 02.16-2004 standard, the IEEE 802.16-2004/Cor1 (hereinafter, referred to as IEEE 802.16e) standard was completed in the form of 'corrigendum' in 2005.

Currently, in order to provide coverage extension and throughput enhancement in the IEEE 802.16 Task Group j (hereinafter, referred to as IEEE 802.16j) based on the "IEEE 802.16e, a relay station has been adopted, and the standardization thereof is in progress.

The use of relay stations in a wireless communication system may be contributive to expanding cell coverage and enhancing transmission performance.

In a case where a base station (BS) provides service to user equipment located outside the coverage of the base station by the use of a relay station, the relay station is made to relay all of control and data signals between the user equipment and the base station. In such a manner, the effect of cell coverage extension can be obtained.

In a case where user equipment is located within the coverage of a base station, a relay station amplifies a data signal between the base station and the mobile station and transmits it to each reception end, so that the user equipment can more stably communicate with the base station, thus enhancing transmission performance. A relay station may be required particularly when user equipment within the coverage of the base station is located in a shadow zone.

That is, in the IEEE 802.16j standard, a relay station is used to enable signal transmission to user equipment outside the coverage of a base station, and to allow user equipment within the coverage of the base station to set a high-quality channel with adaptive modulation and coding (AMC), so that system capacity can be increased with the same amount of radio resources.

As for representative relay modes by which a relay station relays signals between a base station and user equipment, there are an Amplify and Forward (AF) mode, and a Decode and Forward (DF) mode. Here, the AF mode is associated with amplifying a signal received from a base station or user equipment and then transmitting the amplified signal to the user equipment or the base station. In the DF mode, a signal received from a base station or user equipment is demodulated and decoded to recover information, coding, modulation and the like are then performed to generate a signal, and the signal is transmitted to user equipment or a base station.

The AF mode has advantages of short time delay in signal transmission but disadvantageously brings about the propagation or amplification of noise in transmission signals. Meanwhile, the DF mode can remove noise contained in a signal and increase the reliability of a transmission signal, but the demodulation and decoding may cause time delay in signal transmission.

Meanwhile, the development of wireless communication systems and the emergence of various services have continuously increased the demand for radio resources. This increases demand relative to supply of frequency resources, which causes a shortage of frequency. However, despite the shortage of frequency resources, the current frequency use is not efficient in most cases. For example, the actual efficiency of frequency use, measured as part of the Spectrum policy Task Force of FCC, is known to be 30% or less on average.

Accordingly, a cognitive radio communication system based on a Cognitive Radio (CR) scheme has been introduced as a technique that enables the efficient use of frequency resources not being used. This cognitive radio technique refers to a radio technique of determining radio transmission parameters such as frequencies, demodulation schemes, output and the like by sensing the surrounding environment. According to the cognitive radio technique, an unoccupied frequency is searched for according to area and time, thus protecting licensed users while enabling communication between non-licensed users.

In the basic cognitive radio communication system as above, spectrum sensing for non-licensed users, namely, secondary users (SU) is performed to avoid damage to licensed users, namely, primary users (PU). In such a manner, a frequency band that is not in use by the primary users is searched for, and resources in the band are used.

Only when a specific band is completely vacant, the secondary users may use a frequency within the band. Besides that, even if a frequency band is being used by the primary users, both the secondary and primary users may simultaneously use the same frequency band to such an extent that does not affect the primary users. In this simultaneous use, the secondary users may use the same resources as the primary users within the range in which the interference affecting the primary users is below an interference threshold.

In this cognitive radio communication system, to increase capacity for secondary users, many methods have been introduced in the range that maintains such an interference threshold.

However, if there are multiple relay stations that are available, the quality of communication services can be varied according to which relay station is selected. In particular, in the radio environment where primary and second users coexist, there is a need for establishing criteria of selecting an appropriate relay station in due consideration of the influence of transmission power, interference, and the like.

DISCLOSURE

Technical Problem

An aspect of the present invention provides a method for selecting an appropriate relay station considering that transmission performance may be varied depending on the selection of a relay station in using a relaying transmission scheme, in a case where secondary users are using the resources of primary users.

Another aspect of the present invention provides a method for selecting a relay station, capable of ensuring less interference for primary users while using power as high as possible, when a secondary user transmits data using a relay station.

Even after an optimum relay station is selected, a transmission method is selected from among direct-transmission and relay-transmission methods, thus increasing transmission capacity of a cognitive radio system.

Technical Solution

In one embodiment, a method for selecting a relay station includes: enabling a cognitive radio system to receive status information regarding a plurality of candidate relay stations, licensed target stations, and non-licensed target stations; determining an available power threshold value in consideration of the amount of interference affecting the licensed target station and a maximum power value when data is transmitted to the non-licensed target station; and selecting a relay station to be used in transmitting the data in the available power threshold value, in consideration of the status information and the amount of interference.

Advantageous Effects

According to an embodiment of the present invention, the performance of a secondary user can be enhanced while ensuring less interference for a primary user.

According to an embodiment of the present invention, in relay transmission for a secondary user, a relay station capable of maximizing transmission performance such as capacity and the like is selected, and a better method can also be selected between using and not using a relay station.

MODE FOR INVENTION

Figure 1:
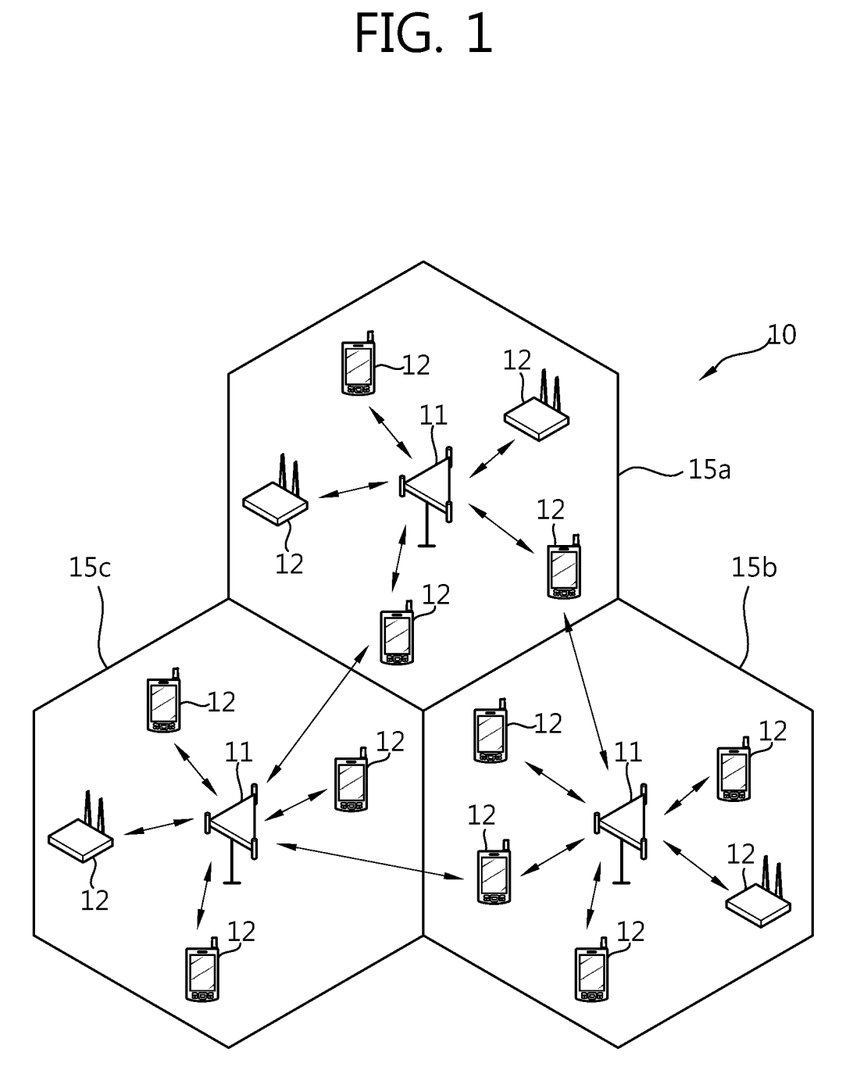
FIG. 1 is a view illustrating a radio communication system.

FIG. 1 illustrates a radio communication system.
Referring to FIG. 1, a wireless communication system 10 includes at least one base station (BS) 11. Each base station 11 provides communication service to specific geographical zones (generally, referred to as cells) 15a, 15b and 15c. Each cell may be divided into a plurality of regions called sectors.

User equipment (UE) 12 may be stationary or has mobility, and may be referred to as other terms such as a mobile station (MS), a user terminal (UT), a subscriber station (SS), a wireless device, a personal digital assistance (PDA), a wireless modem, a handheld device, and the like. In general, the base station 11 means a fixed station communicating with the user equipment 11, and may be called other terms such as evolved-NodeB (eNB), a base transceiver system (BTS), an access point, and the like.

Hereinafter, downlink means communication from a base station to user equipment, and uplink means communication from user equipment to a base station. In downlink, a transmitter may be part of the base station, and a receiver may be part of the user equipment. In uplink, a transmitter may be part of the user equipment, and a receiver may be part of the base station.

Figure 2:
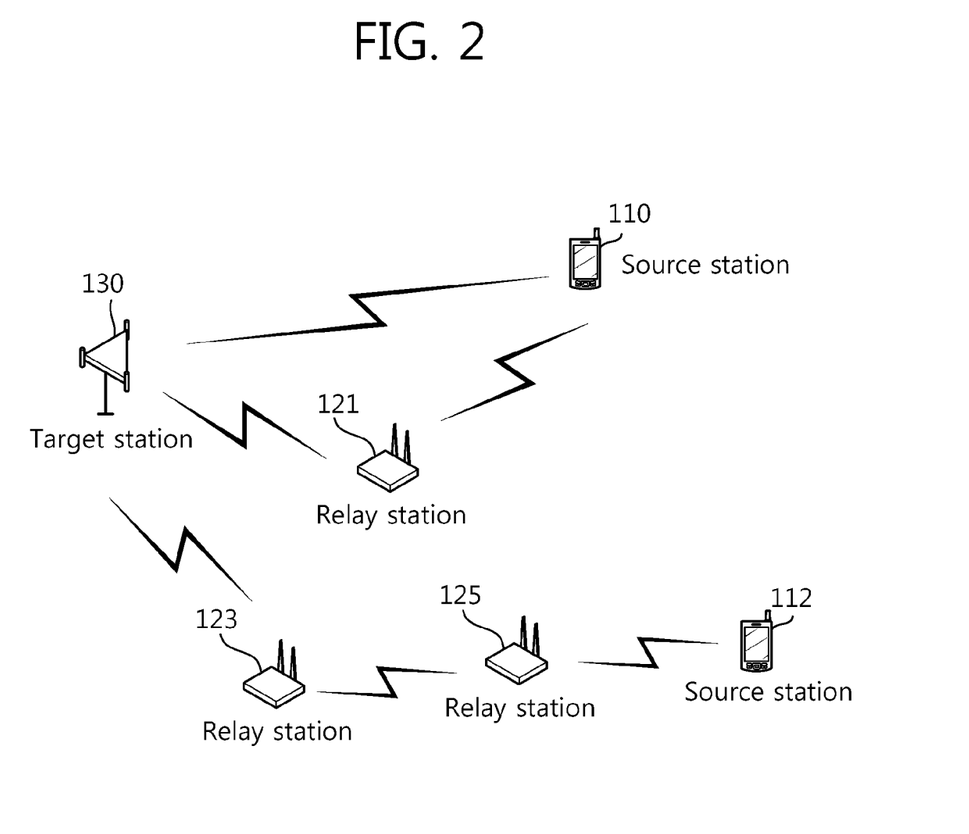
FIG. 2 is a view illustrating a radio communication system using a relay station.

FIG. 2 illustrates a radio communication system using a relay station. For the simplicity of description, FIG. 2 illustrates a single target station 130, three relay stations 121, 123 and 125, and two source stations 110 and 112. However, target stations, relay stations and source stations included in a wireless communication system are not limited to specific number.

In uplink transmission, a source station may be user equipment, and a target station may be a base station. Meanwhile, in downlink transmission, a source station may be a base station, and a target station may be user equipment. A relay station may be user equipment, or a separate relay station may be disposed. A base station may perform functions such as connectivity between a relay station and user equipment, management, control, and resource allocation.

If user equipment, as the source station 110, is located within the coverage of a base station, which is the target station 130, the user equipment may be directly linked to the corresponding base station. However, if severe signal shielding occurs due to the long distance between the user equipment and the base station, a building or the like, or if the user equipment is located outside the coverage of the base station and thus shows a deteriorated channel status with the corresponding base station, the relay stations 121, 123 and 125 within a cell may be used to communicate with the base station so that the communication can be performed in improved channel status.

Here, any method such as an amplify and forward (AF) method, a decode and forward (DF) method or the like may be used as a relaying method used by the relay station. The scope of the present invention is not limited thereto.

Referring to FIG. 2, the source stations 110 and 112 communicate with the target station 130 through the relay stations 121, 123 and 125. In uplink transmission, the source stations 110 and 112 respectively send signals to the target station 130 and the relay station 121 or 125, and the relay station 121 or 125 relays the received signal to the target station 130. In this case, the relay stations 121 and 125 may relay the signal via another relay station 123.

Hereinafter, one source station 110 among the plurality of source stations 110 and 112 will be described by way of example. There are a plurality of relay stations 121, 123 and 125 between the source station 110 and the target station 130, and the source station 110 transmits data through one or more of the relay stations. Because of this relay transmission, the capacity of each link used when the source station 110 transmits data can be increased.

In order to maximize the performance of relay transmission as described above, it is important to select a relay station, allowing for the maximum data size transmittable between the source station 110 and the target station 13, from among the relay stations 121.

To facilitate the selection of an appropriate relay station, the target station 130 broadcasts a relay-station burst. Each relay station measures the quality of a received burst, and transmits this measuring information to the source station 110.

Also, by using the measuring information, the source station 110 selects the most appropriate relay station from among the plurality of relay stations 121, 123 and 125 in order to use it to carry indirect communication between the source station 110 and the target station 130.

As described above, in an existing system, the selection of a relay station is carried out based on information exchange among a relay station, a source and a receiver.

Various information may be used in selecting a relay station. For example, information for selection may be path loss, a carrier-to-noise ratio (C/N) or a carrier-to-interference ratio (C/I), or a combination thereof. Alternatively, an instantaneous channel condition may be used in selecting a relay station.

In terms of capacity, using channel status that instantaneously varies is the most optimum way. According to a value ($h_{SR_k}$) representing the channel status of a link between a source and the kth relay station (hereinafter, referred to as a channel information value), and a channel information value ($h_{R_kD}$) between a relay station and a mobile station, capacity ($C_k^{total}$) in relay transmission through the kth relay station is determined as expressed by the following Equation 1:

$$c_k^{total} = \frac{1}{2}\left[\log\left(1 + \frac{P_S|h_{SR_k}|^2}{N_0}\right), \log\left(1 + \frac{P_R|h_{R_kD}|^2}{N_0}\right)\right] \quad \text{[Equation 1]}$$

In this case, $P_S$ and $P_R$ each denote transmission power between the source station 110 and the kth relay station 121, 123 or 125, and $N_O$ denotes noise power. Therefore, under such a circumstance, the following criterion of selecting a relay station needs to be used in order to maximize the capacity in relay transmission. That is, k has a value of $k^*_{Conv}$ calculated by the following Equation 2:

$$k^*_{Conv} = \underset{k}{\arg\max}\min\{|h_{SR_k}|^2, |h_{R_kD}|^2\} \quad \text{[Equation 2]}$$

That is, the source station 110 compares channel status between the relay stations and a receiver with channel status between the source station 110 and the relay stations, and selects the optimum relay station based on the result of the comparison.

As described above, in selecting a relay station in the existing system other than the cognitive radio system, an appropriate relay station can be selected in consideration of the link status of the source station 110, the target station 130 and the relay stations 121, 123 and 125.

However, in a case of a cognitive radio system where primary users and secondary users coexist, considering only the link status between the secondary users and a relay station may bring about considerable interference even if a low level of power is used for a licensed system receiver. Consequently, the overall performance of secondary users may be degraded.

Therefore, in the cognitive radio environment, there is a need to select a relay station in due consideration of not only a link between secondary users and relay stations but also link status between primary and secondary users.

Figure 3:
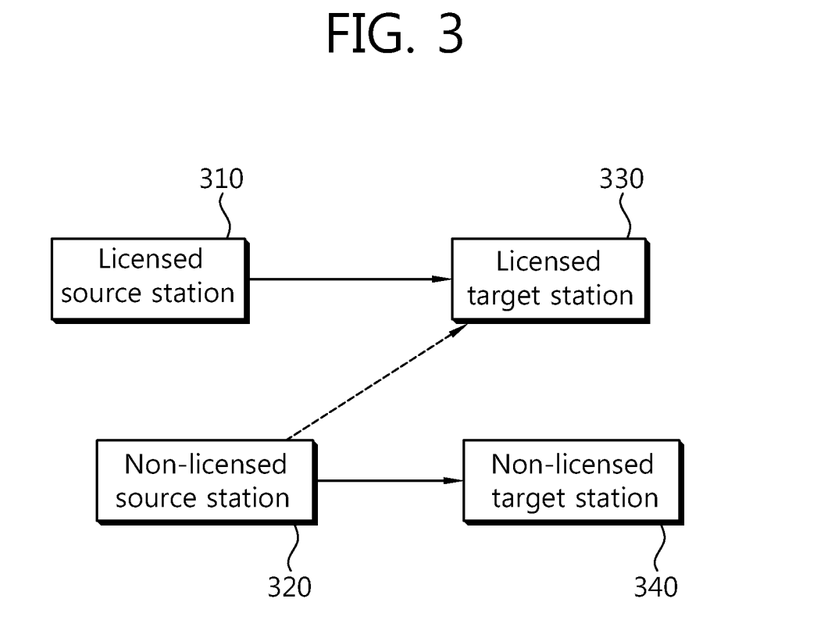
FIG. 3 is a view illustrating a related art cognitive radio system.

FIG. 3 is a view illustrating a related art cognitive radio system.

In such a cognitive radio system, it is important for secondary users to simultaneously use the resources of primary users while ensuring interference not exceeding an interference threshold for the primary users.

In a description made with reference to FIG. 3 and the following descriptions, a party that transmits data in a system of primary users will be referred to as an licensed source station, and a party that receives data in the system will be referred to as an licensed target station for the ease of description and understanding. Also, secondary user equipment, which can perform relaying in a system of secondary users, may be referred to as a candidate relay station, and a relay station, determined to be used in actual data relay transmission among candidate relay stations, may be referred to as a selected relay station. A party that transmits data will be referred to as a non-licensed source station, and a party that receives data will be referred to as a non-licensed target station.

When a non-licensed source station 320 transmits data to a non-licensed target station 340, interference thereof affects primary users, particularly, a licensed target station 330. When an interference threshold permitted by the non-licensed target station 340 is referred to $I_{TH}$, the non-licensed source station 320 can use resources only when the interference from the non-licensed source station 320 is equal to or less than $I_{TH}$. Here, as described above, the resources mean those allocated to primary users.

In order to give the interference of less than a specific interference threshold to the licensed target station 330, the non-licensed source station 320 controls a value of power used in data transmission. When transmission power used by the non-licensed source station 320 is $P_S$, and a channel information value corresponding to a channel between the non-licensed source station 320 and the licensed target station 330 is $h_{SP}$, the amount of interference received in the licensed target station 330 is $P_S|h_{SP}|^2$. Therefore, the non-licensed source station 320 uses transmission power within a limited range as expressed by Equation 3 below:

$$P_S \leq \frac{I_{th}}{|h_{SP}|^2} \quad \text{[Equation 3]}$$

In this case, when the non-licensed source station 320 transmits the maximum power of the limited transmission power range, capacity is obtained as follows:

$$C_{Direct}^{total} = \log\left(1 + \frac{I_{TH}|h_{SD}|^2}{N_0|h_{SP}|^2}\right) \quad \text{[Equation 4]}$$

Therefore, as the transmission power is limited as shown in Equation 3, it becomes difficult for the secondary users (the non-licensed source station 320 and the non-licensed target station 340) to obtain a high level of capacity. In order to improve capacity between the secondary users, an embodiment of the present invention is to introduce a relay transmission method in data transmission between the secondary users (the non-licensed source station 320 and the non-licensed target station 340).

Figure 4:
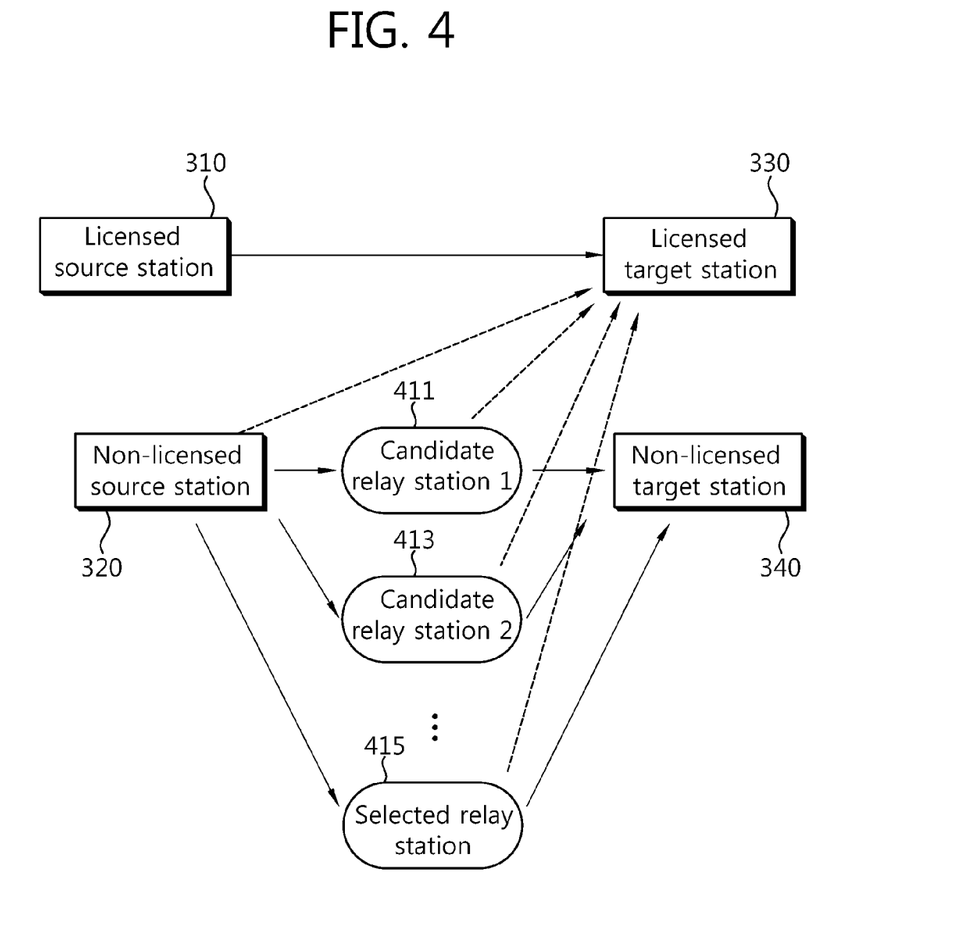
FIG. 4 is a view illustrating a cognitive radio system adopting a method for selecting a relay station according to an embodiment of the present invention.

FIG. 4 is a view illustrating a cognitive radio system adopting a method for selecting a relay station according to an embodiment of the present invention.

In FIG. 4, candidate relay stations 411, 413 and 415 including secondary user equipment exist between the non-licensed source station 310 and the non-licensed target station 340, thus enabling relay transmission between the secondary users.

In relay transmission, the non-licensed source station 310 transmits data to the non-licensed target station 340 within two time slots. In the first time slot, the non-licensed source station 310 transmits data to the kth candidate relay station 415 (hereinafter, referred to as a selected relay station) selected to actually perform relaying from among the candidate relay stations (candidate relay station 1 411, candidate relay station 2 413, . . . ). In the second time slot, the selected relay station 415 relays data to the non-licensed target station 340.

In this relay transmission, interference signals may be received by the licensed target station 330 during the two time slots. For example, when the non-licensed source station 310 performs relay transmission by the help of the selected relay station 415, interference affects the licensed target station 330 from the non-licensed source station 310 in the first time slot. In this case, the amount of interference is $P_S|h_{SP}|^2$.

Also, a channel of a link between the selected relay station 415 and the licensed target station 330 is $h_{R_kP}$, and transmission power used by the selected relay station 415 is $P_{R_k}$, interference of the selected relay station 415 comes therein in the second time slot, and the amount of interference is $P_{R_k}|h_{R_kP}|^2$.

Even in this circumstance, since the amount of interference affecting the licensed source station in each time slot needs to be equal to or smaller than a preset interference threshold, the transmission power of the non-licensed source station 31 is limited as expressed by Equation 3 above.

Furthermore, the range of the transmission power of the relay station 415 is limited as expressed by Equation 5 below:

$$P_{R_k} \leq \frac{I_{th}}{|h_{R_kP}|^2} \quad \text{[Equation 5]}$$

If the transmission power is limited as shown in Equation 1 and Equation 2, transmission capacity between the secondary users, obtained in relay transmission when the maximum power is used within the limited range, may be defined as expressed by Equation 6 below:

$$C_k^{total} = \min\left[\frac{1}{2}\log\left(1 + \frac{I_{th}|h_{SR_k}|^2}{N_0|h_{SP}|^2}\right), \frac{1}{2}\log\left(1 - \frac{I_{th}|h_{R_kD}|^2}{N_0|h_{R_kP}|^2}\right)\right] \quad \text{[Equation 6]}$$

In this case, $N_o$ denotes the power of noise. From Equation 6, it can be seen that when relay stations are used in the cognitive radio environment, the capacity is affected by a channel gain ratio. Therefore, according to the result of the following Equation 7 based on the channel gain ratio, a relay station that maximizes the transmission capacity of the non-licensed source station may be selected.

$$k^*_{CGR} = \arg\max_k \min\left\{\frac{|h_{SR_k}|^2}{|h_{SP}|^2}, \frac{|h_{R_kD}|^2}{|h_{R_kP}|^2}\right\} \quad \text{[Equation 7]}$$

Equation 7 above may be the condition for selecting a relay station in the case of relay transmission under the circumstance where there is no limitation to the maximum value of transmission power technically usable by the non-licensed source station 310. $k^*_{CGR}$ means a k value when a relay station to be actually used is selected from the kth candidate relay station.

However, the non-licensed source station 310 or the non-licensed target station 340 are just devices, and the maximum power that is available for transmission may be limited due to limitations such as interference occurring at the time of power amplification. Accordingly, considering even maximum power ($P^{max}$) usable by secondary users in selecting a relay station, a relay station may be selected based on a threshold of new power as expressed by Equation 8 below:

$$k^*_{Opt} = \arg\max_k \min\left[\min\left\{\frac{I_{th}}{|h_{SP}|^2}, P^{max}\right\} \cdot |h_{SR_k}|^2, \right. \quad \text{[Equation 8]}$$
$$\left. \min\left\{\frac{I_{th}}{|h_{R_kP}|^2}, P^{max}\right\} \cdot |h_{R_kD}|^2\right]$$

$k^*_{Opt}$ means a k value when the kth candidate relay station is used as a relay station to be actually used according to Equation 7, which is the criterion of selecting an optimum relay station. $k^*_{Opt}$ is in the similar form to $k^*_{Conv}$ of Equation 3 or $k^*_{CGR}$ of Equation 7 according to a wireless environment. The case where the interference affecting the licensed target station 330 is considerably small (e.g., in a case where the licensed target station 330 is spaced apart from the secondary user equipment at a sufficiently long distance) corresponds to the case of $$\frac{I_{th}}{|h_{SP}|^2} > P^{max} \text{ and } \frac{I_{th}}{|h_{R_kP}|^2} > P^{max} \text{ in Equation 8.}$$

Accordingly, $k^*_{Opt}$ approaches $k^*_{Conv}$. In this case, the non-licensed source station 310 may select a relay station simply considering only channel status with respect to the non-licensed source station 310, the relay station 415 and the non-licensed target station 340, without considering interference affecting the licensed target station 310.

Meanwhile, in a case where the interference affecting the licensed target station 330 is significantly large (e.g., the licensed target station 330 is not located at a sufficiently long distance from secondary user equipment), the limitation caused by interference affecting the licensed target station 330 becomes greater than the limitation of the maximum power permitted by the non-licensed source station 310, and thus $k^*_{Opt}$ approaches $k^*_{CGR}$.

In the cognitive radio environment, to select an optimum relay station, not only a channel between the non-licensed source station 310, the relay station 415 and the non-licensed target station 340 but also the amount of interference need to be considered based on the channel status with respect to the licensed target station 330. To this end, the secondary user equipment and the primary user equipment need to share channel information.

In order to obtain channel information required for the selection of a relay station, the following method may be used. Since a relay station is not selected until the channel information is acquired, the selected relay station 415 is included in candidate relay station only in describing a method of acquiring channel information.

First, the non-licensed source station 310 transmits a pilot signal, and the licensed target station 330, the non-licensed target station 330 and candidate relay stations 411, 413 and 415 such as another secondary user equipment or the like receive the pilot signal and measure channel status. The candidate relay stations 411, 413 and 415 having received the pilot signal of the non-licensed source station 310 transmit a pilot signal, and the licensed target station 330 and the non-licensed target station 340 receive the pilot signal and thus measure the channel status of links connected with the candidate relay stations.

Also, channel information measured by the non-licensed target station 340, the candidate relay stations 411, 413 and 415 and the licensed target station 330, having received the pilot signal of the non-licensed source station 310, may be transmitted to the secondary source station 310. Here, the channel measuring information may be referred to as a channel information value.

However, there may be a case where the transmission of the channel information according to the above method is impossible. In general, since a channel varies instantaneously, channel information or a channel information value also varies. In order to use the varied value in power allocation or the like, periodic feedback is required. That is, the non-licensed source station 320 may periodically receive and collect the channel information value or channel measuring information from the licensed target station 330, the non-licensed target station 340 or the candidate relay stations 411, 413 and 415.

Of course, it is possible to feed back location information without periodic feedback and channel information. Under such a circumstance, the selection of a relay station may be made based on distance information with respect to the licensed target station 330 and the non-licensed source station 310 and the candidate relay stations 411, 413 and 415.

The criterion of selection, which may be used in this case, is to use a distance ratio therebetween as expressed in Equation 9 below. Here, location information of each base station or user equipment may be used to acquire distance information.

$$k^*_{Opt} = \underset{k}{\arg\max\min}\left\{\frac{d_{SP}}{d_{SR_k}}, \frac{d_{R_kP}}{d_{R_kD}}\right\} \quad \text{[Equation 9]}$$

Here, $k^*_{Dis}$ means a k value in a case where the kth candidate relay station is selected from among candidate relay stations according to location information or distance information. Here, $d_{SP}$ and $d_{R_kP}$ mean the distance between the non-licensed source station 310 and the licensed target station 330, and between the relay station 415, which is the kth secondary user equipment and the licensed target station 330, respectively. $d_{SR_k}$ and $d_{R_kD}$ mean the distance between the non-licensed source station 310 and the selected relays station 415, and the distance between the selected relay station 415 and the non-licensed target station 330. According to the k value obtained by Equation 9, a candidate relay station located as close as possible to the non-licensed source station 310 and the non-licensed target station 340 and located as far as possible from the licensed target station 330 is selected as a relay station.

Figure 5:
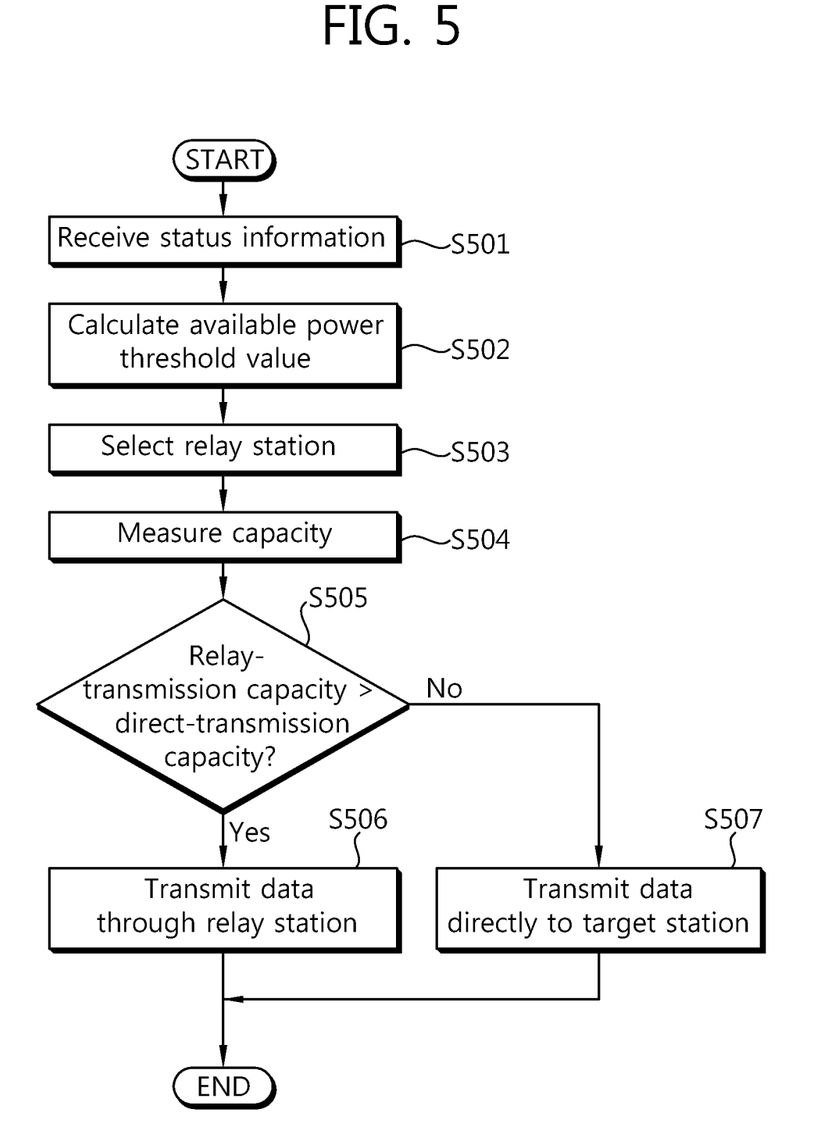
FIG. 5 is a flowchart illustrating a method for selecting a relay station according to an embodiment of the present invention.

FIG. 5 is a flowchart of a method for selecting a relay station according to an embodiment of the present invention.

A non-licensed source station collects status information (S501). Here, the non-licensed source station may be the non-licensed source station described with reference to FIG. 4. The non-licensed source station receives status information from a non-licensed target station, a licensed target station, and candidate relay stations. The status information may be location information or a channel information value acquired as the result of channel measuring.

By using the status information, the amount of interference affecting the licensed target station, and the like, the maximum power value usable by the non-licensed source station, that is, an available power threshold value is calculated (S502). Here, the licensed target station affected by interference may mean the licensed target station mentioned with reference to FIG. 4. To minimize interference to the licensed target station, the available power threshold value is calculated to control a power value used by the non-licensed source station.

The source station selects a relay station from among candidate relay stations included in secondary user equipment, by using the status information (S503). Here, in a case where the status information is distance information with respect to the non-licensed source station, the candidate relay station, the non-licensed target station and the licensed target station, a relay station may be selected by using Equation 9 above.

Alternatively, if the status information is channel status information, channel measuring information, a channel information value or the like, a relay station may be selected by using Equation 7 or 8. In this case, a channel gain ratio calculated from the channel information value is used in the selection of a relay station. The detailed description of the method for selecting a relay station has been made above in association with Equations 7 to 9, and hereinafter, a description thereof will be omitted.

When a relay station is selected, the non-licensed source station may directly relay data through the selected relay station. However, a case where data is transmitted by the relay transmission method using the selected relay station may be compared with a case where data is directly transmitted to a target station without using a relay station, and one of the methods with better transmission performance may be selectively used.

This is because, as described above, the relay transmission method may exhibit better performance than direct transmission, but it is not always the case. Accordingly, in order to prevent less efficient transmission from being performed by using the selected relay station, the relay transmission method is selectively used only when the relay transmission is more effective.

Accordingly, a data transmission process after the selection of a relay station will now be described.

As one example, there may be a method of comparing transmission capacity.

Relay-transmission capacity, namely, capacity in a case where a secondary source station performs relay transmission through a selected relay station is measured or calculated (S504). Also, direct-transmission capacity, capacity in a case where the non-licensed source station directly transmits data to a target station without using a relay station may be calculated.

In this case, the calculated relay-transmission capacity is compared with the direct-transmission capacity (S505). As a result of the comparison, relay transmission is performed only when the relay-transmission capacity is greater than the direct-transmission capacity (S506). If the relay-transmission capacity is smaller, data can be directly transmitted to a target station without using a selected relay station even if there is a selected relay station (S507).

Instead of calculating the direct-transmission capacity, a capacity threshold may be set in advance and compared with relay-transmission capacity, and it may then be determined whether or not relay transmission will be performed.

However, a method of comparing capacity values is more advantageously applicable in the environment where the feedback of channel information is carried out. For example, in a case where capacity obtained when the relay transmission is not in use as shown in Equation 4 is compared with capacity obtained through relay transmission as shown in Equation 6, calculation and comparison based on channel information updated through periodic feedback or the like may lead to more accurate determination upon whether or not relay transmission will be performed.

The method for selecting a relay station and a method for determining whether to perform relay transmission as described above may be used even in a case where data is transmitted over multiple hops, as well as two hops as in the above-described embodiment.

All the methods described above may be performed by a processor of user equipment shown in FIG. 3, a processor such as a microprocessor, a controller, a micro-controller, an application specific integrated circuit (ASIC) or the like according to a program code or software coded to perform the above methods. The design, development and implementation of such a code are obvious to those skilled in the art based on the description of this specification.

While the present invention has been shown and described in connection with the exemplary embodiments, it will be apparent to those skilled in the art that modifications and variations can be made without departing from the spirit and scope of the invention as defined by the appended claims

The invention claimed is:

1. A method, for selecting a relay station in cognitive radio system, the method comprising:
obtaining channel status information; and
selecting $k^*_{CGR}$-th candidate relay station as a relay station from a plurality of candidate relay stations using the following equation:

$$k^*_{CGR} = \operatorname*{argmax}_{k} \min\left\{ \frac{|h_{SR_k}|^2}{|h_{SP}|^2}, \frac{|h_{R_kD}|^2}{|h_{R_kP}|^2} \right\},$$

wherein k is a natural number ranging from 1 to K, K is the number of the plurality of the candidate relay stations, $h_{SR_k}$ is a channel gain from a non-licensed source station to a k-th candidate relay station, $h_{R_kD}$ is a channel gain from the k-th candidate relay station to a non-licensed target station, $h_{SP}$ is a channel gain from the non-licensed source station to a licensed target station, and $h_{R_kP}$ is a channel gain from the k-th candidate relay station to a licensed target station, and
wherein the channel status information includes $h_{SR_k}$, $h_{R_kD}$, $h_{SP}$, $h_{R_kP}$.

2. A method for selecting a relay station in cognitive radio system, the method comprising:
obtaining channel status information; and
selecting $k^*_{Opt}$-th candidate relay station as a relay station from a plurality of candidate relay stations using the following equation:

$$k^*_{Opt} = \operatorname*{argmax}_{k} \min\left\{ \min\left\{ \frac{I_{th}}{|h_{SP}|^2}, P^{max} \right\} \cdot |h_{SR_k}|^2, \min\left\{ \frac{I_{th}}{|h_{R_kP}|^2}, P^{max} \right\} \cdot |h_{R_kD}|^2 \right\},$$

wherein k is a natural number ranging from 1 to K, K is the number of the plurality of the candidate relay stations, $h_{SR_k}$ is a channel gain from a non-licensed source station to a k-th candidate relay station, $h_{R_kD}$ is a channel gain from the k-th candidate relay station to a non-licensed target station, and $h_{SP}$ is a channel gain from the non-licensed source station to a licensed target station, and $h_{R_kP}$ is a channel gain from the k-th candidate relay station to the licensed target station, $I_{th}$ is a maximum allowable interference level to the licensed target station, $P^{max}$ is a maximum power usable by each of the non-licensed source station and the k-th candidate relay station, and
wherein the channel status information includes $h_{SR_k}$, $h_{R_kD}$, $h_{SP}$, $h_{R_kP}$.

3. A method for selecting a relay station in cognitive radio system, the method comprising:
obtaining distance information; and
selecting $k^*_{Dis}$-th candidate relay station as a relay station from a plurality of candidate relay stations using the following equation:

$$k^*_{Dis} = \operatorname*{argmax}_{k} \min\left\{ \frac{d_{SP}}{d_{SR_k}}, \frac{d_{R_kP}}{d_{R_kD}} \right\},$$

wherein k is a natural number ranging from 1 to K, K is the number of the plurality of the candidate relay stations, $d_{SP}$ is a distance from a non-licensed source station to a licensed target station, $d_{R_kP}$ is a distance from a k-th candidate relay station to the licensed target station, $d_{SR_k}$ is a distance from the non-licenced source station to the k-th candidate relay station, and $d_{R_kD}$ is a distance from the k-th candidate relay station to a non-licensed target station, and
wherein the distance information includes $d_{SP}$, $d_{R_kP}$, $d_{SR_k}$, $d_{R_kD}$.

4. The method of claim 3, further comprising
estimating a relay-transmission capacity, which is transmission capacity in a case where relaying data from the non-licensed source station to the non-licensed target station is performed by the selected relay station; and
determining whether or not perform relaying the data, based on the estimated relay-transmission capacity.

5. A transmission method in cognitive radio system, the method comprising:
estimating a relay-transmission capacity; and
determining whether or not perform a relay transmission, based on the estimated relay-transmission capacity,
wherein:
the relay-transmission capacity is a minimum value between a capacity of a link from a source secondary user equipment (SUE) to a selected relay station and a capacity of a link from the selected relay station to a destination SUE;
the capacity for the link from the source SUE to the selected relay station is determined based on a maximum allowable interference level to a primary user equipment (PUE), a channel gain from the source SUE to the PUE, a Signal-to-Noise Ratio (SNR) of the link from the source SUE to the selected relay station; and
the capacity for the link from the selected relay station to the destination SUE is determined based on the maximum allowable interference level to the PUE, a channel gain from the selected relay station to the destination SUE, a SNR of the link from the selected relay station to the destination SUE.

6. The method of claim 5, wherein the determining whether or not perform a relay transmission comprises:
upon a condition in which the relay-transmission capacity is not higher than the capacity for the link from the source SUE to the destination SUE, transmitting the data directly to the destination SUE is determined; and upon a condition in which the relay-transmission capacity is higher than the capacity for the link from the source SUE to the destination SUE, transmitting the data to the selected relay station for the relay transmission is determined.

7. The method of claim 5, wherein the determining whether or not perform a relay transmission comprises:

upon a condition in which the relay-transmission capacity is not higher than a predetermined threshold, transmitting the data directly to the destination SUE is determined; and upon a condition in which the relay-transmission capacity is higher than the predetermined threshold, transmitting the data to the selected relay station for the relay transmission is determined.

* * * * *